Jan. 30, 1962 MITSURU TAKADA 3,019,280
PRESSURE TYPE OIL FEEDING TANK FOR OIL FILLED
CABLES AND OIL FILLED ELECTRICAL
MACHINES AND APPLIANCES
Filed May 29, 1958 2 Sheets-Sheet 1
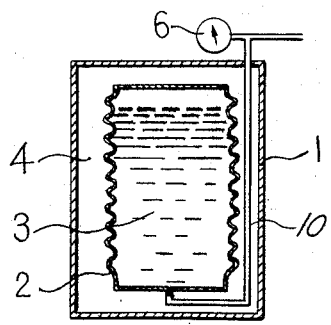
Fig_I
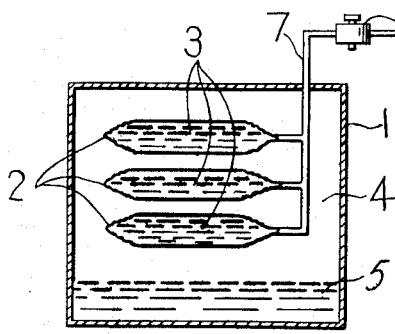
Fig_II
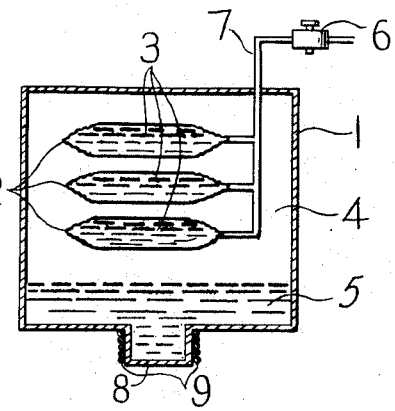
Fig_III
INVENTOR.
MITSURU TAKADA
BY
HIS ATTORNEY

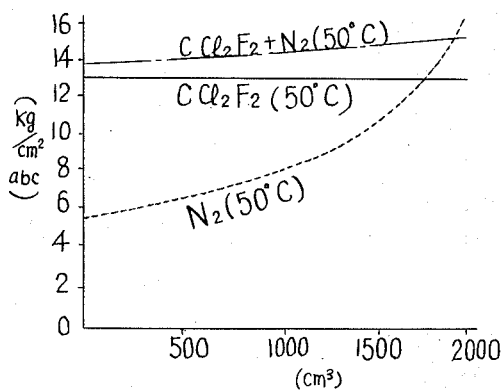
Fig - IV
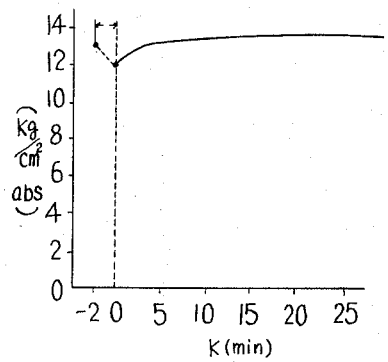
Fig - V
INVENTOR.
MITSURU TAKADA
BY
HIS ATTORNEY

United States Patent Office 3,019,280
Patented Jan. 30, 1962

3,019,280
PRESSURE TYPE OIL FEEDING TANK FOR OIL FILLED CABLES AND OIL FILLED ELECTRICAL MACHINES AND APPLIANCES
Mitsuru Takada, Sumiyoshi-ku, Osaka, Japan, assignor to Sumitomo Electric Industries, Ltd., Knohana-ku, Osaka, Japan, a company of Japan
Filed May 29, 1958, Ser. No. 738,668
Claims priority, application Japan Nov. 2, 1957
5 Claims. (Cl. 174—12)

This invention relates to a pressure type oil feeding tank suitable for oil filled cables and oil filled electrical machines and appliances, such as OF-type cables, oilostatic cables, OF-type condensers and OF-type transformers.

In the said oil filled cables and oil filled electrical machines and appliances, the oil feeding tank plays an extremely important role of regulating the oil quantity depending upon the increase or decrease of the quantity of internal oil which is due to changes in the load of the cables or electrical machines and appliances or to other causes, and of maintaining the internal oil pressure always at a point higher than the atmospheric pressure. As progress has been made in, and demands have increased for, oil filled cables and oil filled electrical machines and appliances, technical improvement and progress in the construction and operation of oil feeding tanks and their supply at a low cost have come to be strongly desired.

Generally, a pressure type oil feeding tank comprises a cell of a variable capacity placed in a sealed container, air, nitrogen or some other gas is contained in the cell while compressed insulating oil is sealed in the space formed by the container and the cell, and the said space is connected with the space in the cable or in the electrical machine or appliance in which insulating oil is filled. If the quantity of oil in the cable or in the electrical machine or appliance undergoes a change for some reason or other, the quantity of oil in the oil feeding tank varies so as to compensate for the change in the quantity of oil in the cable or in the electrical machine or appliance. As a result, thereof the quantity of oil in the cable or in the electrical machine or appliance is adjusted and the oil pressure is maintained always at a point higher than the atmospheric pressure. In the above oil feeding tank hitherto used, the variation ratio of the oil pressure to that of the oil quantity is large, so that it is impossible to utilize the oil feeding tank to its full extent. Its volume will have to be much larger than necessary, making such oil feeding tank economically disadvantageous.

The object of the present invention is to overcome the above-mentioned defects and to provide oil feeding tanks which can be used much more efficiently.

It is characterized in that a cell of a variable capacity provided in a sealed container is connected with the space in the cable or in the electrical machine or appliance in which insulating oil is filled, and that the said cell is filled with compressed insulating oil, while the space formed by the sealed container and the cell is filled with a liquid and the saturated vapor of that liquid co-existent with it.

The invention is further explained with reference to the attached drawings, in which:

FIG. 1 shows a front view of longitudinal section of the pressure type oil feeding tank used in experimenting this invention.

FIGS. 2 and 3 represent front views of longitudinal section of practical embodiments of the invention.

FIGS. 4 and 5 show each the characteristic curves of the pressure type oil feeding tank.

In FIG. 1, 1 indicates a sealed container made of a metal and 2 represents bellows of a variable capacity which is made to open outside by means of a tube 10. 3 represents compressed insulating oil sealed in the bellows, and 4 represents a space formed by the sealed container 1 and the bellows 2. The capacity of the space 4 is 1 liter when the bellows 2 have the largest capacity, while the capacity of the space is 3 liters when the bellows 2 have the smallest capacity. 6 indicates a pressure gauge.

An experiment was made by sealing nitrogen gas in the space 4 of this oil feeding tank in the usual manner. In this case the oil pressure and the oil quantity undergo the changes in accordance with Boyle's law, as shown in FIGURE 4 by dotted lines. That is to say, when the capacity of the bellows 2 has increased to reduce the capacity of the space 4 to one half, the oil pressure is double. When the capacity of the bellows 2 has decreased to double the capacity of the space 4, the oil pressure is reduced to one half.

In FIGURE 2, 1 represents a sealed container made of iron for instance, and 2 a cell of a variable capacity, a suitable number of which are placed in the sealed container 1. Such cells are connected with the oil passage of the cable or of the electrical machine or appliance via valve 6 by means of a pipe 7. 3 represents compressed insulating oil sealed in the cell 2, which is connected with the insulating oil in the cable or in the electrical machine or appliance. In the space formed by the sealed container 1 and the cell 2 are sealed a liquid and the saturated vapor of that liquid co-existent with it, for instance, $CClF_2$ and saturated vapor of $CClF_2$. 4 represents the saturated vapor portion of $CClF_2$, and 5 the liquid portion of $CClF_2$. In this pressure type oil feeding tank, having a liquid and the saturated vapor thereof co-existent therewith, as long as the temperature in the sealed container remains constant, the pressure in the sealed container is kept constant at the pressure of the saturated vapor of that liquid at the said temperature, even when the volume of the saturated vapor undergoes a change. In accordance with this principle, the pressure of the compressed insulating oil 3 is maintained at the pressure of the saturated vapor even when the quantity of the oil in the cable or in the electrical machine or appliance has changed and the volume of the compressed insulating oil in the cell 2 has changed to compensate for the said change, with a consequent change in the volume of the saturated vapor 4 in the container 1. For experimental purpose, I used the pressure type oil feeding tank illustrated in FIG. 1. Namely, the liquid of $CClF_2$ and its saturated vapor were sealed in the space 4. I confirmed that the oil pressure remained always constant as shown by the solid line in FIGURE 4, even when the quantity of oil was gradually changed while keeping the temperature of the liquid portion at 50° C.

It was made possible to obtain a greater change in oil quantity than in the pressure type oil feeding tank hitherto used, while making the capacity of the oil feeding tank smaller. This is extremely advantageous from the economical point of view.

An experiment was made with regard to oil pressure characteristics in relation to transient or abrupt changes in oil quantity, by using the said pressure type oil feeding tank filled with $CClF_2$. As shown in FIGURE 5, the oil pressure dropped about 6% when 2 liters of the oil were rapidly discharged from the full-capacity filling of the compressed insulating oil. After about 15 minutes, however, the original oil pressure was restored. Since the change of oil quantity in the cable, such as OF-type cable, usually takes place not suddenly but gradually, the transient characteristics of this type of oil feeding tank mentioned above do not harm for practical purposes.

FIG. 3 illustrates another embodiment which is an improved one of the tank illustrated in FIG. 2. When the tank ilustrated in FIG. 2 is put to practical use, it is possible that, if the temperature of the ambient atmosphere around the container 1 changes, the saturated vapor pressure of the liquefied gas also changes, changing the oil pressure no matter whether the quantity of oil in the cell 2 changes or not. In such case, more of the compressed insulating oil 3 than necessary is sent into the cable or into the electrical machine or appliance. This possibility is eliminated by the embodiment shown in FIG. 3. In FIG. 3 1-7 correspond to 1-7 in FIG. 2. 8 represents a liquid reservoir sump for the liquefied gas, and 9 represents a temperature regulator provided on the circumference of the liquid reservoir sump 8, which comprises, for instance, a thermostat means of any suitable kind for keeping constant the temperature of the liquid reservoir 8 by means of a relay device not shown that works in conjunction with said thermostat means in accordance with the changes in the temperature of ambient atmosphere. Therefore, the temperature of the liquefied gas is kept constant at all times irrespective of changes in the atmospheric temperature, so that the pressure of the compressed insulating oil is kept constant at all times irrespective of changes in the atmospheric temperature. Needless to say, it is possible to keep the pressure of the compressed insulating oil constant at all times by controlling the temperature of the thermostat by means of a relaying device that works directly in accordance with changes in the pressure of the compressed insulating oil, instead of the relaying device that works in accordance with changes in the atmospheric temperature.

When the pressure type oil feeding tanks are practically used it is sometimes necessary to obtain desired changes in pressure in accordance with changes in the quantity of oil. In a further practical embodiment of the above described pressure type oil feeding tank, the liquid and vapors of said liquid in the sealed container 1 may be provided with additional gases such as air and nitrogen, which gas or gases do not liquefy at the temperatures and under the pressures occurring in the use of cables, machines and appliances. In such pressure type oil feeding tanks, the following formula is applicable:

$$P = Pc + \frac{V}{V \pm v} \cdot Pn$$

where,

P = oil pressure (kg./cm.$^2$)
Pc = saturated vapor pressure of liquefied gas (kg./cm.$^2$)
Pn = pressure at the time of filling of the gas which does not get liquefied at temperatures and under pressures occurring in the use of cables etc. (kg./cf.$^2$)
V = volume of the said gas filled under pressure Pn (cm.$^3$)
v = change in oil quantity (cm.$^3$)

In the above formula, the sign before v shall be minus where the quantity of oil in the oil feeding tank increases and plus where it decreases. As seen also from the above formula, it is possible to obtain a pressure type oil feeding tank by which can be obtained desired changes in oil pressure in relation to changes in oil quantity, by suitably choosing the pressure and volume of the gas that does not get liquefied. This is shown by chain line in FIG. 4.

It is needless to say that, in the above embodiments of the pressure type oil feeding tank, two or more kinds of liquefied gases having different saturated vapor pressures may be used in mixture.

I claim:

1. A pressure type oil feeding apparatus for oil filled appliances such as cables and oil filled electrical machines, including a closed container with a single chamber, an expansible and contractible impervious cell means mounted in said chamber of the container and occupying substantially all but incapable of filling said chamber when fully expanded thus leaving a space, a sealed connection from the appliance through said chamber to the interior of said cell means, an insulating oil completely filling the appliance and said cell means and said sealed connection therebetween to provide more insulating oil than is actually needed to fill the appliance, a fluid consisting of a liquid and the saturated vapor of said liquid sealed under pressure within said space in said chamber of said container and effective to exert pressure on said filled cell means, said liquid selected to repeatedly permit gasification and liquefaction within said chamber, and means to maintain said liquid at its conversion state of gasification and liquefaction to maintain the varying quantities of sealed insulating oil in said cell means under constant pressure.

2. The pressure type oil feeding container of claim 1 characterized in that the liquid and the saturated vapor of said liquid making up said fluid consists of two independent liquids and the saturated vapor of each liquid, and said fluid is sealed under pressure within said space in the chamber of said container.

3. The pressure type oil feeding container of claim 1 characterized in that said fluid including a liquid and the saturated vapor of said liquid is $CCl_2F_2$.

4. The pressure type oil feeding container of claim 1 characterized in that said fluid including a liquid and the saturated vapor of said liquid includes $CCl_2F_2$ and $N_2$.

5. The pressure type oil feeding container of claim 1 characterized by a thermal device attached to said closed container to maintain a constant temperature of the liquid within the chamber of said container regardless of the ambient temperature of the appliance.

References Cited in the file of this patent
UNITED STATES PATENTS

| | | |
|---|---|---|
| 1,227,404 | Du Bois | May 22, 1917 |
| 1,933,347 | Shanklin | Oct. 31, 1933 |
| 2,759,987 | Narbutovskih | Aug. 21, 1956 |
| 2,845,472 | Narbutovskih | July 29, 1958 |

FOREIGN PATENTS

| | | |
|---|---|---|
| 22599/29 | Australia | Jan. 24, 1930 |
| 131,940 | Austria | Feb. 25, 1933 |
| 444,856 | Great Britain | Mar. 30, 1936 |
| 578,471 | Great Britain | June 28, 1946 |
| 705,145 | Great Britain | Mar. 10, 1954 |